United States Patent
Dingfelder et al.

(10) Patent No.: US 8,301,273 B2
(45) Date of Patent: Oct. 30, 2012

(54) METHOD FOR PROVIDING FUNCTIONS IN AN INDUSTRIAL AUTOMATION SYSTEM, CONTROL PROGRAM AND INDUSTRIAL AUTOMATION SYSTEM

(75) Inventors: Sabine Dingfelder, Bubenreuth (DE); Dieter Schneider, Wörth (DE)

(73) Assignee: Siemens AG, Munich (DE)

( * ) Notice: Subject to any disclaimer, the term of this patent is extended or adjusted under 35 U.S.C. 154(b) by 324 days.

(21) Appl. No.: 12/708,623

(22) Filed: Feb. 19, 2010

(65) Prior Publication Data

US 2010/0217423 A1    Aug. 26, 2010

(30) Foreign Application Priority Data

Feb. 19, 2009 (EP) .................................... 09002332

(51) Int. Cl.
G05B 11/01 (2006.01)
G05B 19/42 (2006.01)
G06F 9/44 (2006.01)

(52) U.S. Cl. ............... 700/19; 700/18; 700/20; 700/86; 700/181; 717/100

(58) Field of Classification Search ............. 700/17–20, 700/83, 86–87, 181; 717/100
See application file for complete search history.

(56) References Cited

U.S. PATENT DOCUMENTS

| | | | |
|---|---|---|---|
| 6,021,418 A * | 2/2000 | Brandt et al. | 715/205 |
| 6,993,456 B2 * | 1/2006 | Brooks et al. | 702/183 |
| 7,263,597 B2 * | 8/2007 | Everdell et al. | 712/11 |
| 7,272,815 B1 * | 9/2007 | Eldridge et al. | 717/101 |
| 7,546,232 B2 * | 6/2009 | Brooks et al. | 702/183 |
| 7,574,417 B1 * | 8/2009 | McGreevy et al. | 706/59 |
| 7,881,816 B2 * | 2/2011 | Mathiesen et al. | 700/47 |
| 8,060,222 B2 * | 11/2011 | Eldridge et al. | 700/83 |
| 2003/0144746 A1 * | 7/2003 | Hsiung et al. | 700/28 |
| 2004/0150667 A1 * | 8/2004 | Dove et al. | 345/763 |
| 2005/0278670 A1 * | 12/2005 | Brooks et al. | 716/5 |
| 2006/0100934 A1 * | 5/2006 | Burr et al. | 705/26 |
| 2007/0022204 A1 * | 1/2007 | Moch et al. | 709/230 |

* cited by examiner

*Primary Examiner* — Ramesh Patel
(74) *Attorney, Agent, or Firm* — Cozen O'Connor

(57) ABSTRACT

In order to provide functions in an industrial automation system having control units which are coupled via a communication network, functions of the automation system are made available by services. Components of a service are subdivided into service-specific components and into components which can be reused by a plurality of different services. Service-specific components and reusable components have a standard configuration interface. Service components are linked to a service by a service configuration unit via the standard configuration interface. Functions for monitoring and/or controlling a defined quality of service are assigned to the reusable components.

14 Claims, 2 Drawing Sheets

METHOD FOR PROVIDING FUNCTIONS IN AN INDUSTRIAL AUTOMATION SYSTEM, CONTROL PROGRAM AND INDUSTRIAL AUTOMATION SYSTEM

BACKGROUND OF THE INVENTION

Industrial automation systems are used to monitor, control and regulate technical processes, such as in the field of production, process and building automation, and make it possible to operate control devices, sensors, machines and industrial installations, which should be performed as autonomously and independently of human intervention as possible. Due to an ever increasing importance of information technology for automation systems, which comprise numerous networked computer units, methods for reliably providing functions distributed over an automation system are becoming increasingly important for the purpose of providing monitoring, control and regulating functions.

In the case of distributed services, whose service components are provided by a plurality of different computer units for implementing functions of the automation system, high demands are imposed on a communication infrastructure of an automation system. On the one hand, it is usually necessary to satisfy demands for real-time communication which is characterized by a comparatively large number of relatively short messages, and, on the other hand, the intention is to be able to use different communication protocols for distributed services as transparently as possible. An inefficient communication infrastructure may jeopardize error-free provision of a service and may have a disadvantageous effect on system stability and availability.

In addition, highly different client demands are often imposed on availability and quality of service, as well as data filtering and information pre-compression, when accessing data and measured values associated with services within an industrial automation system. Furthermore, there are demands for existing services to be able to be extended by optional or additional service components without having to substantially change a data and function model on which implementation of an existing service is based. These demands were previously satisfied by essentially separately implementing functions for ensuring a defined service availability or data filters for all services on the service side within an industrial automation system. This is extremely disadvantageous with regard to efficiently providing and maintaining the functions. Separate individual solutions are also problematic with regard to a consistent system behavior in the case of distributed services.

Previous approaches provide a specific communication adapter which is assigned to an individual service control unit and is adapted to the individual service control unit. Therefore, far-reaching adaptation work on the communication adapter is often required in the event of changes to components of a service managed by the service control unit.

SUMMARY OF THE INVENTION

It is therefore an object of the invention to provide a reliable and efficient method for providing functions in an automation system having control units which are coupled by a communication network and to specify suitable apparatuses or means for performing the method.

This and other objects and advantages are achieved in accordance with the invention by a method, a control program, and an automation system in which functions in an industrial automation system having control units which are coupled by a communication network are made available by services. Here, the control units can preferably be programmed. Furthermore, the automation system may be a production, process or building automation system, for example.

In accordance with the invention, components of a service are subdivided into service-specific components and into components which can be reused by a plurality of different services. In addition, service-specific components and reusable components have a standard configuration interface. Furthermore, service components are linked to a service by a service configuration unit by the standard configuration interface. Functions for monitoring and/or controlling a defined quality of service are assigned to the reusable components. This considerably reduces the effort needed to implement measures for ensuring a defined quality of service and minimizes potential error sources when implementing the measures. This also reduces the effort involved in maintaining functions for monitoring or controlling a defined quality of service. In addition, a consistent system behavior is achieved because measures for ensuring a defined quality of service are handled in a standard manner throughout the system.

Functions for implementing data filters, which can be used by a client application to selectively receive messages from selected services which are relevant to the application, are preferably also assigned to the reusable components. As a result, a further reduction is achieved in implementation and maintenance effort and in potential error sources. In addition, the provision of data filters on the service side, in a manner which is standard throughout the system, makes it possible to considerably reduce the workload of the communication network.

Moreover, the reusable service components may also comprise service-internal interfaces for message and/or data access by further service-specific components. As a result, it also is possible to subsequently integrate additional or optional service-specific components in a service, in a simple manner, and to resort to reusable functions for ensuring a defined quality of service or data filters without the need for communication using external service interfaces and adaptations to an existing internal object model of a service. In accordance with a preferred embodiment of the present invention, service-specific components have standard communication interfaces to reusable components.

Services of the automation system are preferably provided by the control units within a service-oriented architecture. Service-oriented architectures (SOA) are aimed at structuring services in complex organizational units and making them available to a multiplicity of users. Here, for example, existing components of a data processing system, such as programs, databases, servers or websites, are coordinated such that duties provided by the components are combined to form services and are made available to authorized users. Service-oriented architectures enable application integration by hiding the complexity of individual subcomponents of a data processing system behind standardized interfaces. As a result, a particularly reliable and flexible provision of control information is provided for a computer-based object in an automation system.

The method in accordance with the invention can be implemented by a control program for providing functions in an automation system. Here, the control program can be loaded into a main memory of a control unit and has at least one code section whose execution causes the above-described steps of the method in accordance with the invention to be performed if the control program is executed in the control unit.

The automation system in accordance with the invention comprises a plurality of control units which are connected to one another by a communication network and are intended to provide functions of the automation system in the form of services whose components have been subdivided into service-specific components and into components which can be reused by a plurality of different services. In this case, service-specific components and reusable components have a standard configuration interface. In addition, at least one service configuration unit for linking service components to a service by the standard configuration interface is provided in accordance with the invention. Furthermore, the automation system comprises a control unit for assigning functions for monitoring and/or controlling a defined quality of service to the reusable components.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below in an exemplary embodiment using the drawing, in which.

DETAILED DESCRIPTION OF THE PRESENTLY PREFERRED EMBODIMENTS

Figure 1:
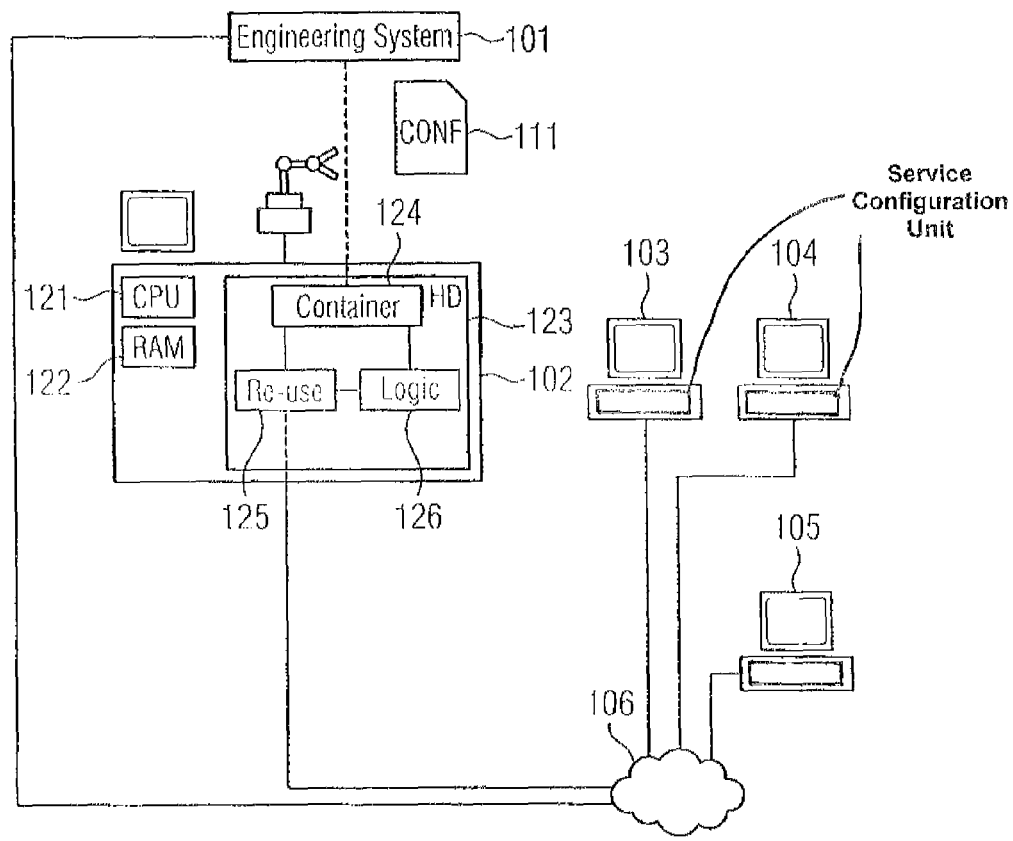
FIG. 1 shows a diagrammatic illustration of an automation system having a plurality of control units which are connected to one another by a communication network.

The industrial automation system illustrated in FIG. 1 comprises an engineering system 101 and a plurality of programmable control units 102-105 which are connected to one another as network nodes via a communication network 106. The control units 102-105 provide functions of the automation system in the form of local services which are configured and activated using configuration data.

The engineering system 101 is used to configure, maintain, start up and document the automation system and provides configuration data 111. The configuration data 111 include information for assigning services to control units 102-105 and to dependencies between services, and are made available to service configuration units assigned to the control units 102-105 by the engineering system 101. The service configuration units then transmit the configuration data to service-specific or reusable components of local services over a configuration interface. A service-specific component or a reusable component is initialized by loading the transmitted configuration data when starting the respective service-specific component or reusable component. A service-specific component is advantageously activated first, and a dependent reusable component is then activated when the service-specific component is called by the reusable component.

Service-specific components and reusable components have a standard configuration interface. The respective service configuration unit links service components to a service over the standard configuration interface.

The operation of providing functions in an industrial automation system is described by way of example below for a control unit 102 and can also be applied to the remaining control units 103-105 in a corresponding manner. The control unit 102 comprises a processor 121, a main memory 122 and a hard disk 123 for the non-volatile storage of program code, application data and user data. The hard disk 123 of the control unit 102 stores program code 124 for providing a local service. In the present exemplary embodiment, the local service is used, for example, to drive metrological or actuating peripherals, such as sensors or robots. The program code stored on the hard disk 123 can be loaded into the main memory 122 of the first control unit 102 and can be executed by the processor 121 to provide the local service. The code for providing the local service comprises code 124 for implementing a service configuration unit, as well as code 125, 126 for implementing a service-specific component or a component which can be reused by a plurality of different services and into which the local service has been subdivided.

Figure 2:
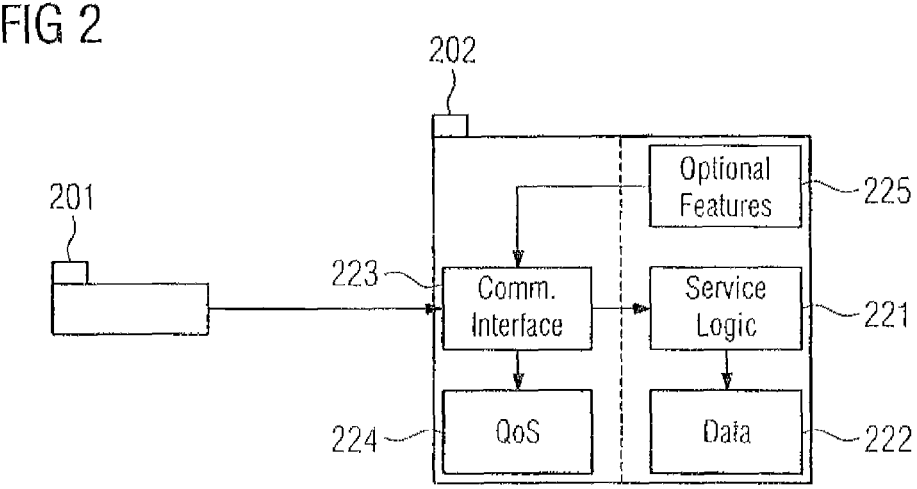
FIG. 2 shows a detailed illustration of components of a service provided by one of the control units illustrated in FIG. 1.

According to the detailed illustration of components of the local service 202 provided by the control unit 102 in FIG. 2, functions which
a) are specific to a selected service, or
b) are used or provided by a plurality of local services or all local services and are not service-specific
are subdivided within a service-oriented architecture.

In the present exemplary embodiment, service-specific functions are provided by a component 221, which logically implements the local service 202, and a component 222 which manages an object model of the local service 202 and object-model-specific data.

Functions which can be reused by a plurality of different local services are implemented by a component 223 for providing a communication interface to a client application 201 and by a component 224 for controlling and monitoring a defined quality of service. The component 223 for providing the communication interface also comprises functions for implementing data filters which can be used by the client application 201 to subscribe to relevant messages from selected services. Furthermore, this component also provides a service-internal interface for message or data access by a further service-specific component 225 which implements optional functions of the local service 202. The further service-specific component 225 can thus use reusable functions without the need for communication through an external service interface. Functions which are dependent on an internal object model of a service should preferably be assigned to service-specific components.

Figure 3:
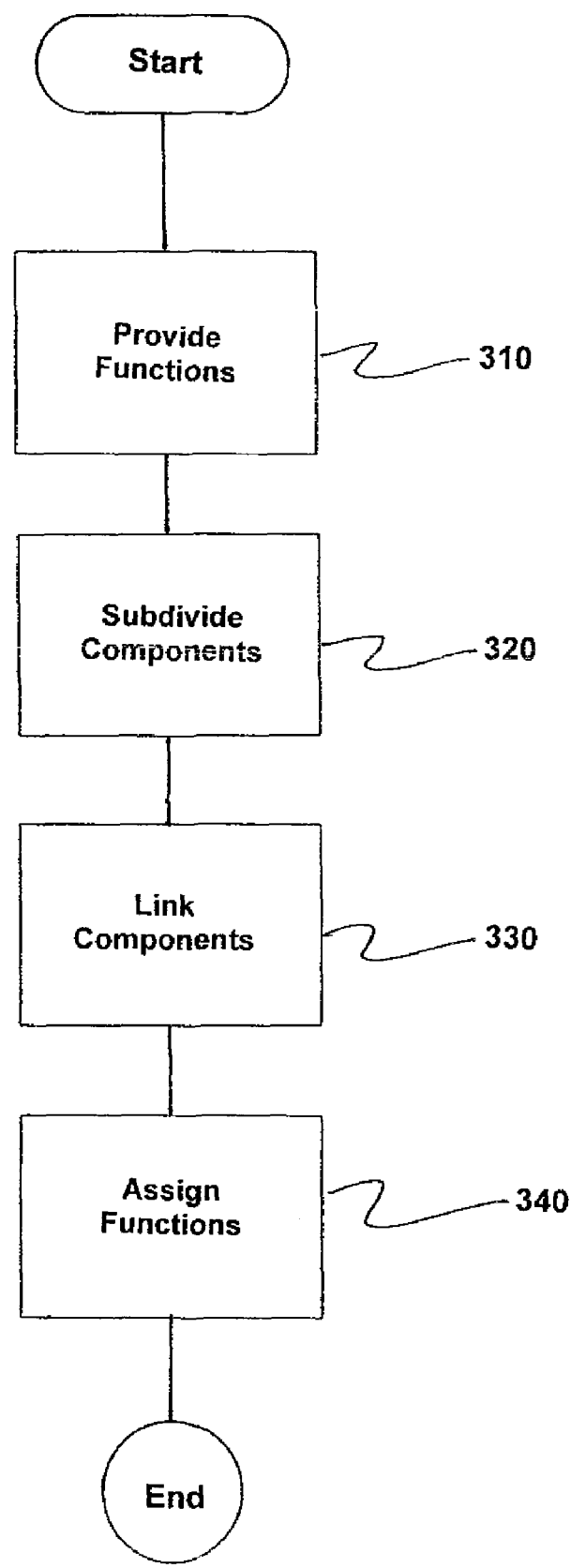
FIG. 3 is a flow chart illustrating a method in accordance with an embodiment of the invention.

FIG. 3 is a flow chart illustrating the method for providing functions in an industrial automation system having control units which are coupled by a communication network in accordance with an embodiment of the invention. The method comprises providing functions of the industrial automation system from services, as indicated in step 310. Next, components of a service are subdivided into service-specific components and into components which are reusable by a plurality of different services, as indicated in step 320. Here, the service-specific components and reusable components having a standard configuration interface. Components of the service are then linked to a service by a service configuration unit over the standard configuration interface, as indicated in step 330. Functions for monitoring and/or controlling a defined quality of service are then assigned to the reusable components, as indicated in step 330.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

We claim:

1. A method for providing functions in an industrial automation system having control units which are coupled by a communication network, comprising:
   providing functions of the industrial automation system from services;
   subdividing components of a service into service-specific components and into components which are reusable by a plurality of different services, the service-specific components and reusable components having a standard configuration interface;
   linking components of the service to a service by a service configuration unit over the standard configuration interface; and
   assigning functions for at least one of monitoring and controlling a defined quality of service to the reusable components.

2. The method as claimed in claim 1, wherein functions for implementing data filters, which are useable by a client application to selectively receive messages from selected services which are relevant to the client application, are assigned to the reusable components.

3. The method as claimed in claim 1, wherein the reusable service components comprise at least one of service-internal interfaces for message and data access by further service-specific components.

4. The method as claimed in claim 2, wherein the reusable service components comprise at least one of service-internal interfaces for message and data access by further service-specific components.

5. The method as claimed in claim 1, wherein the service-specific components have standard communication interfaces to the reusable components.

6. The method as claimed in one of claim 1, further comprising:
   transmitting, by a service configuration unit, configuration data to at least one of the service-specific component and a reusable component through a configuration interface; and
   loading the transmitted configuration data when starting at least one of the service-specific component and the reusable component to initialize at least one of the service-specific component and the reusable component.

7. The method as claimed in claim 6, wherein the service-specific component is then activated first and a dependent reusable component is then activated when the service-specific component is called by the reusable component.

8. The method as claimed in either of claim 6, wherein the configuration data are made available to the service configuration unit by an engineering system for at least one of configuring, maintaining, starting up and documenting the automation system.

9. The method as claimed in either of claim 7, wherein the configuration data are made available to the service configuration unit by an engineering system for at least one of configuring, maintaining, starting up and documenting the automation system.

10. The method as claimed in claim 1, wherein the control units provide the services of the automation system within a service-oriented architecture.

11. The method as claimed in claim 1, wherein the control units are programmable.

12. The method as claimed in claim 1, wherein the automation system comprises one of a production, process and building automation system.

13. A process in which a computer apparatus executes instructions set forth in a control program executing on a processor, which when used on the computer apparatus, causes the processor to provide functions in an automation system, the computer program comprising:
   program code for linking service components to a service by a service configuration unit through a standard configuration interface, functions of the automation system being made available by services, components of a service having been subdivided into service-specific components and into components which are reusable by a plurality of different services, and service-specific components and reusable components having a standard configuration interface; and
   program code for assigning functions for at least one of monitoring and controlling a defined quality of service to the reusable components, if the control program is executed in the control unit.

14. An industrial automation system, comprising:
   a plurality of control units which are connected to one another by a communication network, each of said plural units providing functions of an automation system as services with components subdivided into service-specific components and into components which are reusable by a plurality of different services, service-specific components and reusable components having a standard configuration interface;
   at least one service configuration unit for linking service components to the services through the standard configuration interface; and
   a control unit for assigning functions for at least one of monitoring and controlling a defined quality of service provided to the reusable components.

* * * * *